United States Patent

Myong et al.

Patent Number: 5,958,529
Date of Patent: Sep. 28, 1999

[54] SIDE ENTRY SEALING DEVICE

[75] Inventors: Inho Myong, Newark, Calif.; David W. Solano, Troy, Mich.

[73] Assignee: Raychem Corporation, Menlo Park, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/752,096

[22] Filed: Nov. 20, 1996

[51] Int. Cl.$^6$ ............................ F16L 11/00; B65B 53/02
[52] U.S. Cl. .................... 428/34.9; 428/35.1; 428/163; 428/179; 428/343; 138/128; 138/156; 138/167; 174/DIG. 8
[58] Field of Search ................... 428/34.9, 35.1, 428/134, 136, 138, 343, 347, 349, 163, 179; 174/DIG. 8, 92, 84 R; 138/128, 156, 158, 167; 156/84.86

[56] References Cited

U.S. PATENT DOCUMENTS

| | | | |
|---|---|---|---|
| 3,770,556 | 11/1973 | Evans et al. | 161/39 |
| 3,847,721 | 11/1974 | Evans | 161/108 |
| 3,899,807 | 8/1975 | Sovish | 24/255 C |
| 3,913,444 | 10/1975 | Otte | 174/DIG. 8 |
| 3,959,052 | 5/1976 | Stanek | 156/86 |
| 4,280,258 | 7/1981 | Kunze | 24/257 |
| 4,442,155 | 4/1984 | Foertsch et al. | 428/99 |
| 4,498,938 | 2/1985 | Moisson et al. | 174/192 |
| 4,518,448 | 5/1985 | Henry et al. | 156/86 |
| 4,560,828 | 12/1985 | Franckx et al. | 174/71 |
| 4,699,821 | 10/1987 | Hallock | 428/36 |
| 4,713,272 | 12/1987 | Bachel et al. | 138/167 |
| 4,731,271 | 3/1988 | Heucke et al. | 428/36 |
| 4,735,836 | 4/1988 | Giebel et al. | 428/36 |
| 4,761,194 | 8/1988 | Pithouse et al. | 156/86 |
| 4,795,509 | 1/1989 | De Bruycker | 428/34.9 |
| 4,860,799 | 8/1989 | Van Noten | 138/167 |
| 4,865,890 | 9/1989 | Erlichman | 428/35.1 |
| 4,900,596 | 2/1990 | Peacock | 428/34.5 |
| 5,215,607 | 6/1993 | Read et al. | 428/35.1 |
| 5,300,732 | 4/1994 | Wambeke et al. | 174/92 |
| 5,322,972 | 6/1994 | Fitch et al. | 324/318 |
| 5,451,278 | 9/1995 | Nolf | 428/34.9 |

FOREIGN PATENT DOCUMENTS

| | | |
|---|---|---|
| 4032376 A1 | 4/1992 | Germany. |
| 2043729 | 10/1980 | United Kingdom. |
| WO 94/27299 | 11/1994 | WIPO. |

*Primary Examiner*—Rena L Dye
*Attorney, Agent, or Firm*—Sheri M. Novack; Herbert G. Burkard

[57] ABSTRACT

A side entry heat recoverable article. The heat recoverable article comprises a longitudinal body member composed of a cross-linked polymer and having a generally C-shaped cross section. The body member preferably includes circumferential ribs. A layer of adhesive adjacent to the interior surface of the body member may be co-extruded with the body member or provided separately. The heat recoverable article is preferably used for repairing damaged wire.

9 Claims, 2 Drawing Sheets

5,958,529

SIDE ENTRY SEALING DEVICE

This invention relates to a side entry device, particularly for use in repairing damaged wire or wire bundles.

BACKGROUND OF THE INVENTION

Heat recoverable sleeves have found widespread application in protection and sealing of wire bundles.

Heat recoverable articles are well known. They are articles the dimensional configuration of which may be made substantially to change when subjected to heat treatment. Usually these articles recover, on heating, towards an original shape from which they have previously been deformed; but the term "heat recoverable," as used herein, also includes an article, which, on heating, adopts a new configuration, even if it has not been previously deformed.

During the handling of electrical harnesses, particularly in automotive applications, wire insulation is sometimes nicked or otherwise damaged and must be repaired or replaced. The most common procedure is to repair the damage by cutting the wire at the damage site, stripping insulation from the wire, splicing the ends, covering the joint and heating to insulate and seal. This process is time consuming and produces a final product which is often bulky, inflexible and does not meet the quality standards specifications.

Attempts have been made to provide sleeves which may be installed at any point along a line without requiring access to its end, as is typically required with the use of tubes or sleeves. The problem most commonly encountered in constructing and installing such a wrap around or side entry article is the provision of a closure device capable of withstanding the considerable shrinkage forces exerted during recovery, and yet simple enough to be manufactured and used in a practical manner. Typical wrap around articles are also difficult to handle and install, tending to unwrap around the wire bundle while closure is effected, taking considerable time and skill. Examples of wrap around type heat recoverable articles can be found in U.S. Pat. Nos. 4,900,596; 4,865,890; 4,860,799; 4,795,509; 4,735,836; 4,731,271; 4,699,821; 4,560,828; 4,518,448; 4,442,155; 4,280,258; 3,959,052; 3,899,807; 3,847,721 and 3,770,556; International Publication WO 94/27299; Great Britain Patent Application 2 043 729 and German Patent Application 40 32 376 which are hereby incorporated by reference for all purposes.

SUMMARY OF THE INVENTION

We have invented a side entry heat recoverable article which is flexible, economical, easy to manufacture, and easy and quick to install.

A first aspect of the invention comprises a heat recoverable article which comprises an inwardly radially heat recoverable body member which:

(a) is composed of a cross-linked crystalline polymer, and
(b) comprises a longitudinal member which
  (i) has a generally C-shaped cross section and two longitudinal edges which define an aperture between them, and
  (ii) includes at least two circumferential ribs.

A second aspect of the invention comprises a method of repairing damaged wire insulation, the method comprising:

providing a heat recoverable longitudinal cross-linked crystalline polymeric body member which
  (i) has a generally C-shaped cross section and two longitudinal edges which define an aperture between them, and
  (ii) includes at least two circumferential ribs;

positioning the body member around the damaged wire such that the damaged section of wire is covered by the body member and the aperture opens on an undamaged section of wire;

providing a layer of heat-activatable adhesive between the damaged wire and the body member; and heating the body member to activate the adhesive and recover the body member.

A third aspect of the invention comprises a method of manufacturing a heat recoverable article, the method comprising the following steps, in order:

providing an extruded, crosslinked crystalline polymeric body member having an aperture which extends from end to end of the body member and is defined by longitudinal edges of the body member;

heating the body member to an elevated temperature equal to or above the crystalline melting temperature range;

while the body member is at its elevated temperature, forcing the body member into a deformed condition by separating the longitudinal edges which define the aperture; and while the body member is in the deformed condition, cooling to a temperature below the crystalline melting temperature range.

Other features and advantages of the present invention will appear from the following description in which the preferred embodiment has been set forth in detail in conjunction with the accompanying drawings.

DETAILED DESCRIPTION OF THE PREFERRED EMBODIMENT

Figure 1:
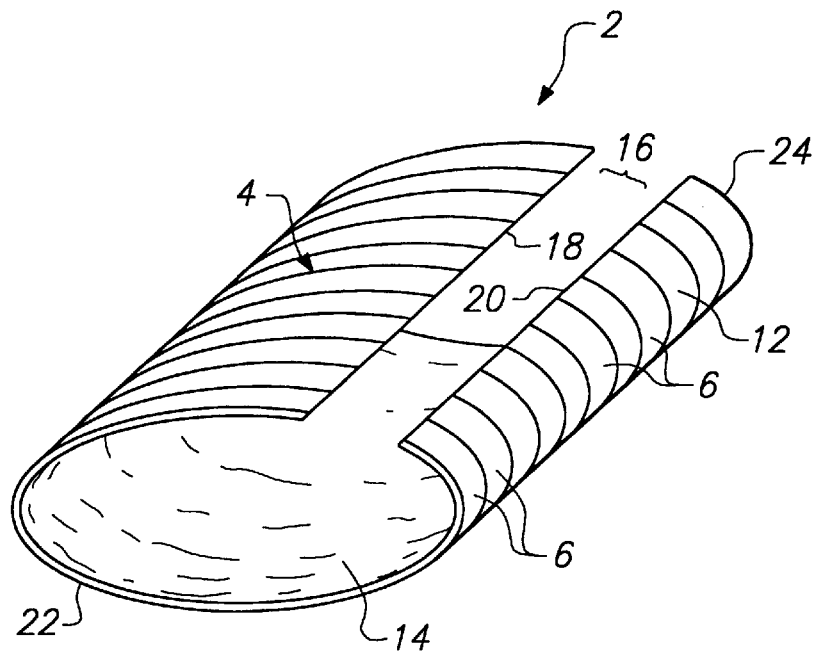
FIG. 1 is a perspective schematic view of a preferred embodiment of the present invention.
Figure 2:
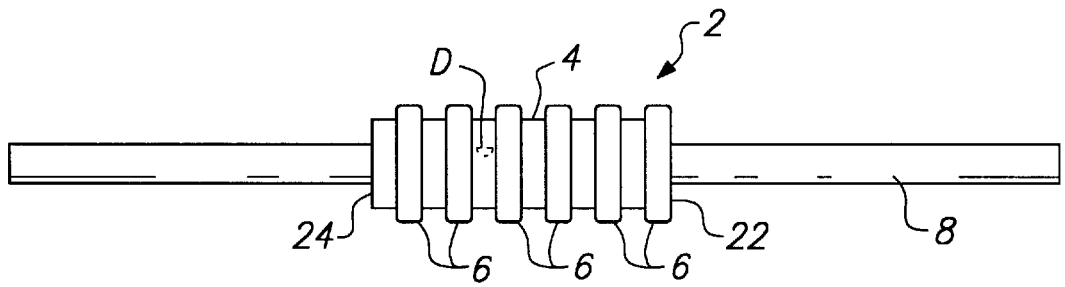
FIG. 2 is a side elevational schematic view of a preferred embodiment of the present invention positioned on a damaged wire prior to recovery.
Figure 4:
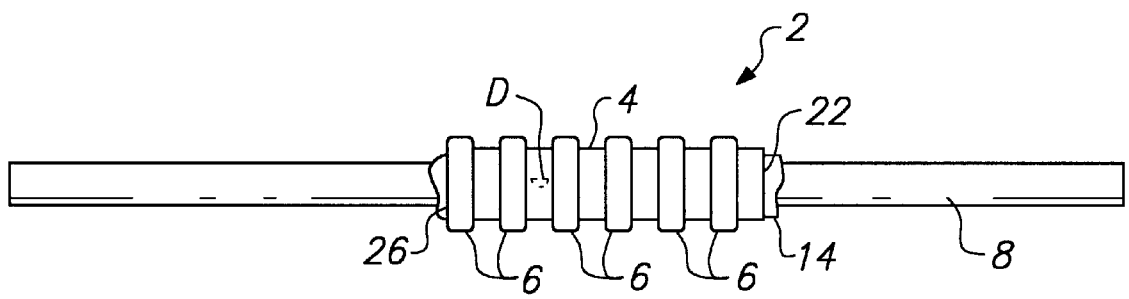
FIG. 4 is a side elevational schematic view of a preferred embodiment of the present invention recovered around a damaged section of wire.
Figure 5:
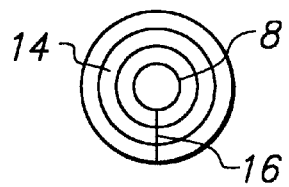
FIG. 5 is a cross-sectional schematic view of a preferred embodiment of the present invention recovered around a damaged section of wire.
Figure 6:
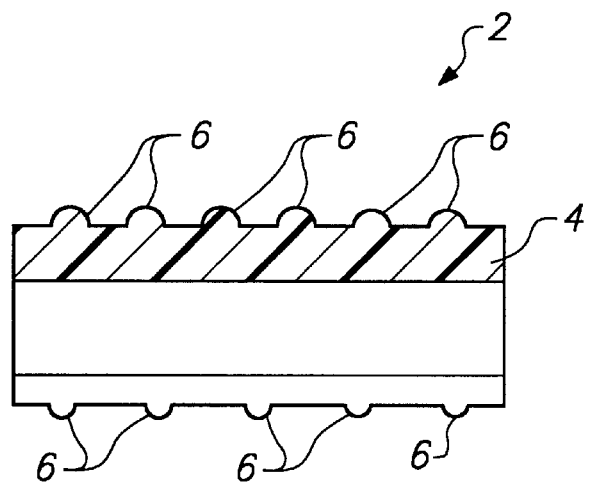
FIG. 6 is a cross-sectional schematic view of a preferred embodiment of the present invention.

Referring now to the drawings, the present invention is directed to a heat recoverable article 2 which comprises a body member 4 and ribs 6. As seen in FIGS. 2, 4 and 5, heat recoverable article 2 may, in use, be positioned on an insulated wire 8. For illustration purposes, the insulation on wire 8 is shown in FIGS. 2 and 4 as being damaged at a section of wire referenced by the letter D.

Figure 3:
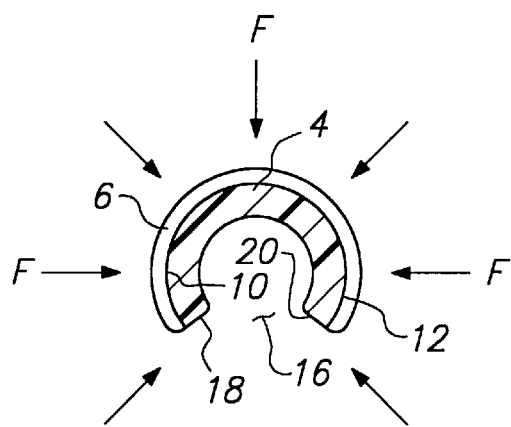
FIG. 3 is a cross-sectional schematic view of a preferred embodiment of the present invention.

Body member 4 includes a longitudinal member having a generally C-shaped cross-section, as seen in FIGS. 3 and 5. Body member 4 is inwardly radially heat recoverable such that upon recovery as indicated by arrows F, the radial dimension (i.e., diameter) of the body member recovers to its original configuration.

The term "C-shaped" includes any configuration which is partially closed and has edges. For example, a U-shaped configuration, a generally rounded configuration having an aperture defined by two edges, a generally squared configuration having an aperture defined by two edges, or any other configuration which is at least partially closed and has edges that are not connected, are defined herein as being "C-shaped."

Ribs 6 are circumferential and preferably extend from longitudinal edge 18 to longitudinal edge 20. The preferred embodiment comprises at least two ribs, and more preferably a plurality of ribs closely axially spaced together throughout the length of the body member. Ribs 6 may be formed on either inside surface 10 of body member 4, outside surface 12 of body member 4, or both the inside and outside surfaces. The plurality of ribs may be convolutions formed in the body member during extrusion or may be formed in a helical manner by spinning a shaper, upon extrusion. The ribs are desirable, although not essential, because they allow the finished product to remain flexible. It should be understood that it is within the scope of the present invention to provide a body member which does not include any circumferential ribs.

A layer of adhesive 14 is adjacent to interior surface 10 so that, upon recovery, heat recoverable article 2 may seal around wire 8. Adhesive layer 14 may be co-extruded with body member 4, may be applied to interior surface 10, or may be provided as a separate sleeve having a slit from end to end for placement around wire 8.

Body member 4 comprises a crosslinked crystalline polymer, preferably poly(vinylidene fluoride) flame retarded tubing. Adhesive layer 14 is preferably a polyamide based adhesive. It should be noted that any suitable crosslinked polymer or adhesive may be utilized.

Heat recoverable article 2 may be manufactured from an extruded, crosslinked crystalline polymeric body member. Body member 4 may be provided in the form of tubing. The body member is provided with an aperture 16 which extends from end 22 to end 24 and is defined by longitudinal edges 18, 20. After the crosslinked body member has been slit to create aperture 16, it is heated to an elevated temperature equal to or above the crystalline melting temperature range. While the body member is at its elevated temperature, it is forced into a deformed condition by separating longitudinal edges 18, 20 which define aperture 16. While the tubing is in its deformed condition, it is cooled to a temperature below the crystalline melting temperature range.

Heat recoverable article 2 may be employed to repair a damaged wire. In use, heat recoverable article 2, including body member 4 and adhesive layer 14, are positioned around a substrate such as a damaged section D of wire 8 such that the damaged section of wire is covered by body member 4 and adhesive layer 14, and longitudinal aperture 16 opens on an undamaged section of wire. Heat recoverable article 2 is sized such that the inner diameter of heat recoverable article 2 is slightly smaller than the outer diameter of the substrate. The article is thus held in place prior to recovery by elastic forces generated by forcing it around the substrate. Heat recoverable article 2 is then heated to activate adhesive layer 14 and recover body member 4.

Insulated wires employed in automotive applications generally have a diameter of between approximately 0.02 inch and 0.75 inch. Several individual wires may make up a wire bundle. Heat recoverable article 2 is preferably used for repairing damaged wire insulation and is sized to cover and protect a damaged section of wire or wire bundle. It is noted, however, that the size of the present invention is not limited to wires or wire bundles and may be sized for use in sealing around or protecting any generally rounded substrate.

While this invention has been described for use in repairing a section of damaged wire, the present invention may be used in conjunction with any generally rounded substrate. The invention may be used to seal around any such substrate. Variations and modifications can be made to the preferred embodiment without departing from the scope of the present invention, which is limited only by the following claims.

What is claimed is:

1. A heat recoverable article which comprises an inwardly radially heat recoverable body member which:
   (a) is composed of a cross-linked crystalline polymer, and
   (b) comprises a longitudinal member which
      (i) has a generally C-shaped cross section and two longitudinal edges which define an aperture between them, and
      (ii) includes at least two circumferential ribs.

2. The article as defined in claim 1 wherein the circumferential ribs extend from one longitudinal edge to the other longitudinal edge.

3. The article as defined in claim 1 wherein a plurality of circumferential ribs are spaced along the length of the body member.

4. The article as defined in claim 3 wherein the circumferential ribs are convolutions formed in the body member.

5. The article as defined in claim 3 wherein the circumferential ribs are depressions formed in the body member.

6. The article as defined in claim 1 further comprising a layer of adhesive used in combination with the body member, and positioned adjacent to an interior surface of the body member.

7. The article as defined in claim 6 wherein the layer of adhesive and the body member have been coextruded.

8. The article as defined in claim 6 wherein the layer of adhesive and the body member are separable prior to recovery of the heat recoverable body member.

9. The article as defined in claim 8 wherein the adhesive and the body member are provided separately.

* * * * *